Figure 28:
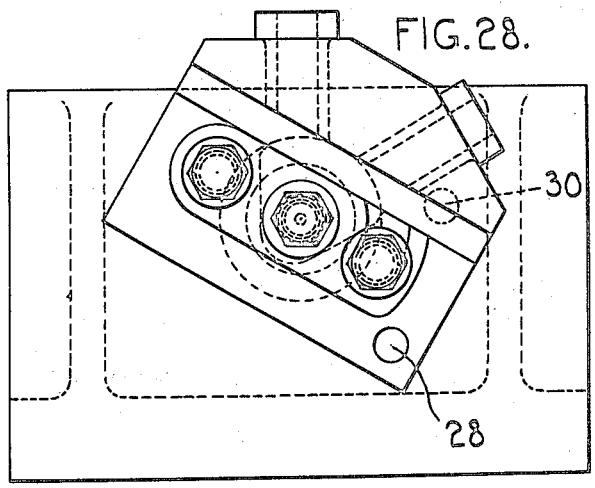
Figure 34:
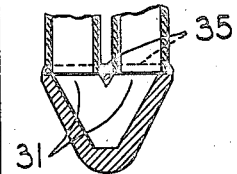
Figure 36:
Figure 35:
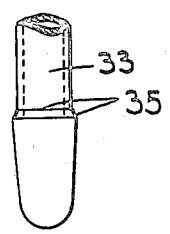

R. A. THOM.
RETURN END AND METHOD OF MAKING SAME.
APPLICATION FILED AUG. 31, 1921.
1,425,222.
Patented Aug. 8, 1922.
4 SHEETS—SHEET 1.
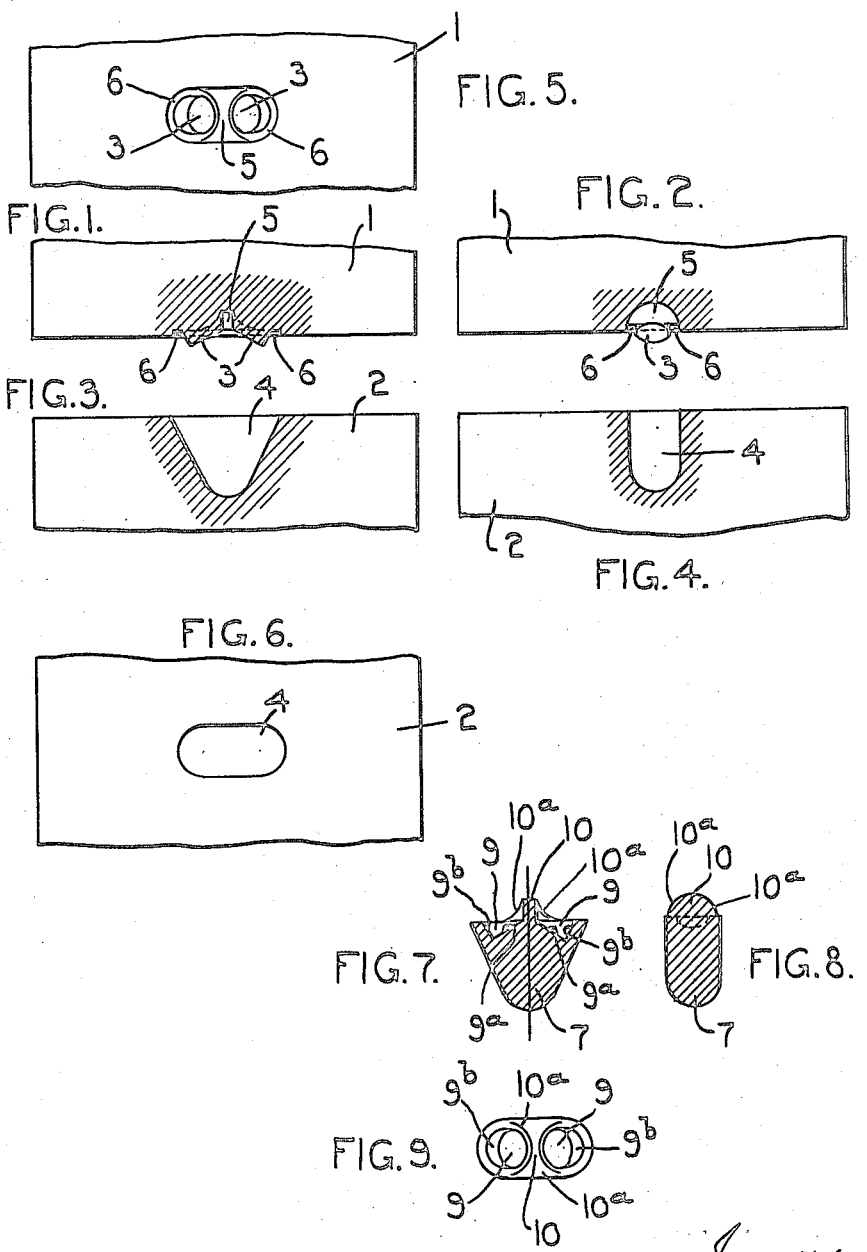

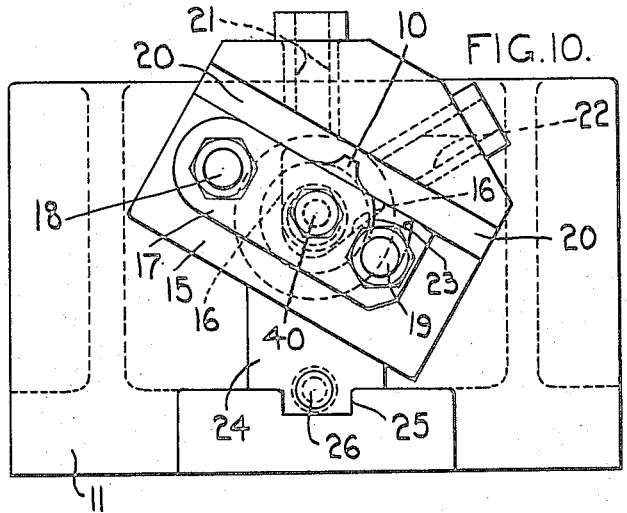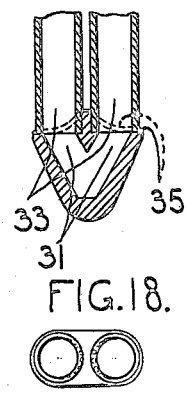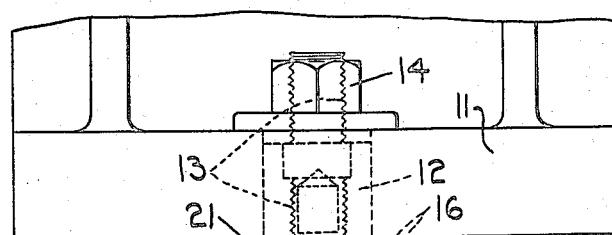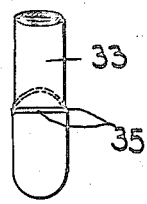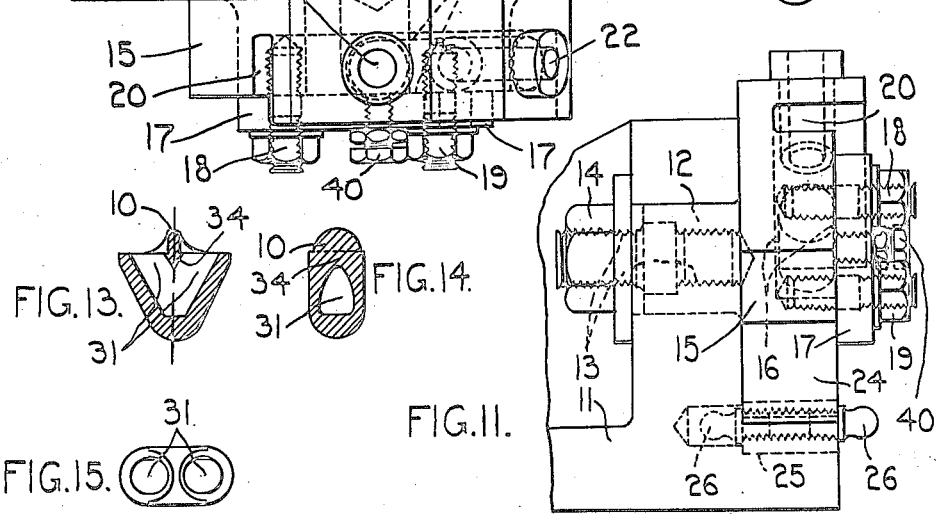

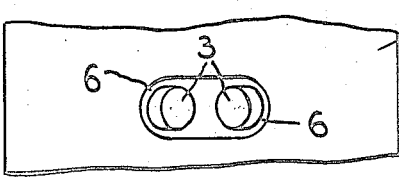
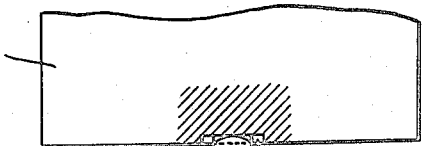
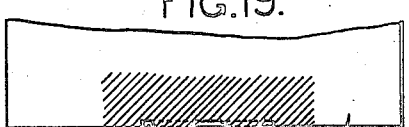
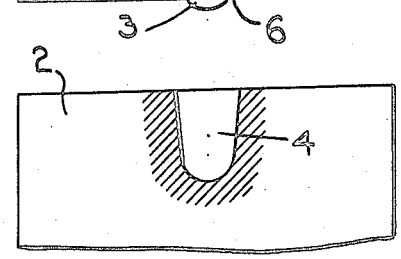
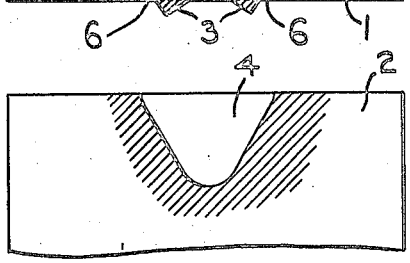
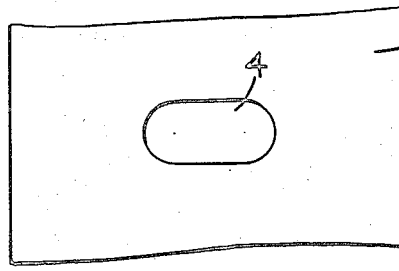
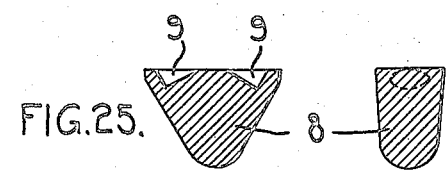

R. A. THOM.
RETURN END AND METHOD OF MAKING SAME.
APPLICATION FILED AUG. 31, 1921.

1,425,222.

Patented Aug. 8, 1922.
4 SHEETS—SHEET 4.

Inventor
Robert A. Thom
by Herbert W. Jenner
Attorney.

UNITED STATES PATENT OFFICE.

ROBERT ABSALOM THOM, OF MANCHESTER, ENGLAND.

RETURN END AND METHOD OF MAKING SAME.

1,425,222.  Specification of Letters Patent.  Patented Aug. 8, 1922.

Application filed August 31, 1921. Serial No. 497,273.

*To all whom it may concern:*

Be it known that I, ROBERT ABSALOM THOM, a subject of the King of Great Britain and Ireland, residing at Fairfield, Manchester, in the county of Lancaster, England (whose post-office address is 11 Leven Terrace, Fairfield, Manchester, in the county of Lancaster, England), have invented certain new and useful Improvements in Return Ends and Methods of Making Same (for which I have filed application in Great Britain, No. 153,676, Aug. 13, 1919); and I do hereby declare the following to be a full, clear, and exact description of the invention, such as will enable others skilled in the art to which it appertains to make and use the same.

This invention has for its object improvements in wrought metal return or "torpedo" ends for steam superheater elements and in the method of manufacturing such ends.

The return end according to this invention is produced by one drop stamping operation and two simple drilling operations, the end being thus cheap to manufacture.

According to this invention a billet of wrought steel of suitable size is heated to the required temperature and operated on by a pair of suitable dies so as to produce in one operation a solid stamping having the shape of the finished return end but having in the end thereof which is to face the pipes to be joined two recesses or depressions the centre lines of which intersect at a point in the body of the end towards the extreme end thereof, said recesses providing a lead for the drill employed in the drilling operations hereinafter described. These recesses may be of such size that a wall of metal surrounds them of a thickness greater to the desired extent than the thickness of the pipes to be joined, the bore of the recesses being substantially the same as that of said pipes. For manufacturing one form of end according to this invention the dies are such as to also produce on the stamping a projecting web or fin of solid metal between and extending outwardly or forwardly from said recesses said web or fin sloping away at the relatively flat sides of the stamping so as to blend into the walls surrounding the recesses.

The return end according to this invention and the method of manufacturing the same are hereinafter described with reference to the accompanying drawings, in which,—

Figs. 1 to 6 inclusive show views of the dies employed for producing one form of stamping or forging in the manufacture of return ends according to this invention, Figs. 1 and 2 being sectional elevations of the top die, Figs. 3 and 4 sectional elevations of the bottom die, Fig. 5 an inverted plan view of the top die, and Fig. 6 a plan of the bottom die, certain portions of the die blocks being broken away in each of these figures.

Figs. 7 and 8 are sectional elevations of the stamping or forging produced by the dies illustrated in Figs. 1 to 6, and Fig. 9 is a plan of such stamping or forging.

Figs. 10 and 11 shew in front and side elevation respectively a suitable jig for holding the stamping or forging during the drilling operations hereinafter described, Fig. 12 being a plan of the jig shewn in Figs. 10 and 11.

Figs. 13 and 14 are sectional elevations of the return end after the drilling operations have been performed, Fig. 15 being a plan of such return end.

Fig. 16 shews in sectional elevation the return end shewn in Figs. 13 and 14 welded to the ends of two portions of superheater pipe or element, Fig. 17 being a side elevation of the end welded to the portions of the element, and Fig. 18 a plan of Fig. 16.

Figs. 19 to 24 inclusive are views similar to Figs. 1 to 6 but shew die blocks employed in stamping or forging an alternative and preferred form of return end according to this invention.

Figs. 25 and 26 shew in sectional elevation the forging produced by the dies illustrated in Figs. 19 to 24, Fig. 27 being a plan of the forging shewn in Fig. 25.

Figure 30:
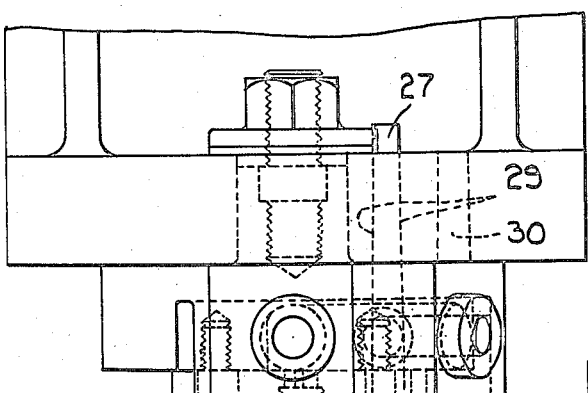
Figures 29, 31, 32, 33:
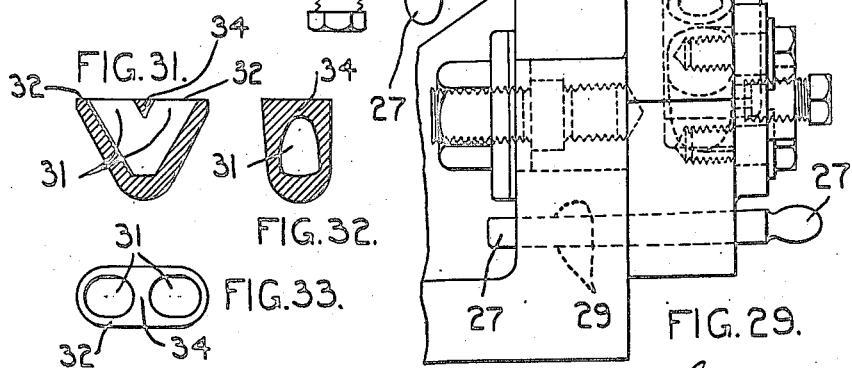

Figs. 28, 29 and 30 are views similar to Figs. 10, 11 and 12, of a modified form of jig which may conveniently be used for drilling the forging according to this invention, and Figs. 31 to 36 are views similar to Figs. 13 to 18 but illustrate the said alternative and preferred form of return end.

Referring to the drawings, 1 and 2 are the upper and lower die blocks respectively, the upper die block being provided with two projections 3 as shewn and the lower block with a recess 4 of suitable shape. In Figs. 1, 2 and 5 the upper die is also provided between the projections 3 with a central recess 5 of such shape as to cause the formation on the forging of a central web or fin hereinafter described, said recess breaking into or connecting with a recess 6 surrounding the projections 3.

A billet of suitable metal is heated to the required temperature and placed in position between the dies 1 and 2 and the dies are brought together. By the forging operation so performed the billet is formed into a blank 7 or 8 on which drilling operations are subsequently performed, as hereinafter described. The blank 7 produced by the dies shewn in Figs. 1 to 6 is illustrated in Figs. 7, 8 and 9, and comprises a solid body portion having in one end surface two recesses or depressions 9 separated by an upstanding web or fin 10. The recesses or depressions 9 are such that they each have a flat or plane surface $9^a$ and a curved or arc-shaped side wall $9^b$, said recess providing leads for the drill employed in the drilling operations hereinafter described. The web or fin 10 as it approaches the sides of the forging becomes thicker and also slopes or curves as at $10^a$ so as to blend into the main portion of the forging. The dies shewn in Figs. 19 to 24 produce the forging or blank 8 illustrated by Figs. 25, 26 and 27, the blank 8 having similar recesses 9 to those described with reference to blank 7, Figs. 7, 8 and 9, but the web or fin 10 and portion $10^a$ are of course not formed on the blank by the dies of Figs. 19 to 24.

The blank 7 or 8, is next drilled to provide the throughway of the return end. Suitable jigs for use when performing the drilling operations are shewn in Figs. 10, 11 and 12 and in Figs. 28, 29, 30, and referring to said figures, 11 is a right angle plate forming the main base plate of the jig on the vertical wall of which the clip or clamp, in which the blank is held, is pivotally mounted, 12 being a boss on the rear of the main portion of the clamp which boss is rotatably mounted in a suitable hole in said vertical wall, 13 a stud screwed into said boss 12, and 14 a clamping nut on said stud. The clip or clamp comprises the above-mentioned main portion 15, in which a recess 16 is formed or provided to receive the blank to be drilled, and a front movable or re-movable plate or cover 17 for closing the open front of said recess, said plate 17 being clamped in position on the main portion 15 by studs and nuts or other screw devices 18, 19. 40 is a clamping screw working through a tapped hole in the plate 17, 20 being a slot in the main portion 15 of the clamp or holder, and 21, 22 tubular drill guides provided at the required angle to one another in the said main portion 15, the slot 20 being provided to permit the drillings to pass freely from the drill. The plate or cover 17 is at one end provided with a suitable slot at 23 so that by slackening the nuts or screw devices 18, 19 the plate 17 can be swung out of the position in which it closes the recess 16. On a blank being placed in the recess the plate 17 is again swung into position and secured by the screw devices, and screw 40 screwed up to engage the blank and hold it firmly in position in the recess. The clamp is then, or has previously been, set in position with one drill guide 21, or 22, under the drill spindle of the drilling machine, and may be held in said position either by a reversible bevel block 24, Figs. 10 and 11, whose position is determined by a guide slot 25 in the base 11, 26 being knobs or handles on said block, or by a pin 27, Figs. 28, 29 and 30, taking through a hole 28 in the main portion 15 and into one of two holes 29, 30 in the base 11. On a drill being passed through the guide and operated, one portion of the passage forming the throughway in the return end is drilled in the blank, the particular recess 9 of the blank providing a lead for the drill. The clamp is moved to its other position and a second drilling performed, the blank being by these drilling operations formed into the completed return end shewn in Figs. 13, 14 and 15, or in Figs. 31, 32 and 33, as the case may be, the two holes drilled intersecting and thus providing the throughway 31 shewn. The end face 32 may then, if necessary, be machined or otherwise finished true, after which the return end is welded to the portions of pipe or element 33, as illustrated in Figs. 16, 17 and 18 or by Figs. 34, 35 and 36, by deposition of metal as at 35, at the small shoulder or ledge formed where the portions of pipe and the return end meet.

The end face 32 of the block is flat and extends diagonally of the two inclined or converging drilled holes which form the throughway 31; and the bridge piece extends crosswise between the outer ends of the two holes at the end face 32.

It will be seen that the return end according to this invention is produced by one forging or drop stamping operation, and two simple drilling operations, and has an integral bridge portion 34. The return end according to this invention may also have an upstanding or projecting integral fin or web 10 which takes between the ends of the portions of pipe or element and assists in correctly positioning them for welding and in supporting them when welded.

What I claim as my invention and desire to secure by Letters Patent is:—

1. The method of making return ends for pipes, which consists in first forging a block of solid wrought metal of the shape of the desired return end, and then drilling two converging holes into the block from one face thereof until the inner ends of said holes intersect each other and form an angular through passage in the block.

2. The method claimed in claim 1 of manufacturing return ends for superheater elements, further characterized in that one of the dies employed for shaping the forged or stamped blank is provided with means whereby a pair of angularly disposed recesses are formed in the blank providing leads for the drills employed in drilling the throughway in the return end.

3. The method claimed in claim 1, of manufacturing return ends for superheater elements, further characterized in that one of the dies employed for shaping the forged or stamped blank is provided with means whereby there is produced on the blank an integral upstanding web or fin adapted when the finished end is welded to the portions of pipe or element to take between the ends of said portions, for the purposes set forth.

4. A return end or coupling for pipes, comprising a weldless block of wrought metal having a passage formed of two holes arranged at an angle to each other and communicating with each other at their inner ends in the block, said block having an integrally formed bridge at its end face between the outer ends of the said holes.

5. A return end or coupling for pipes, comprising a weldless block of wrought metal having a passage formed of two straight holes drilled in the block at an angle to each other and communicating with each other at their inner ends, said block having an integrally formed bridge at its end face between the outer ends of the said holes.

6. A return end or coupling for pipes, comprising a weldless block of wrought metal having a passage formed of two holes arranged at an angle to each other and communicating with each other at their inner ends, said block having an integrally formed bridge at its end face between the outer ends of the said holes, and the said end face around the holes being arranged diagonally of the two inclined or converging holes.

In testimony whereof I affix my signature.

ROBERT ABSALOM THOM.